Patented May 14, 1940

2,200,437

UNITED STATES PATENT OFFICE 2,200,437

HIGHLY VISCOUS POLYMERIZATION PRODUCTS AND A PROCESS OF PREPARING THEM

Arthur Voss, Frankfort-on-the-Main-Hochst, Germany, and Werner Heuer, deceased, late of Hofheim, Germany, by Johanna Auguste Asta Heuer, administratrix, Hofheim, Germany, assignors to I. G. Farbenindustrie Aktiengesellschaft, Frankfort-on-the-Main, Germany No Drawing. Application December 15, 1938, Serial No. 246,000. In Germany July 26, 1934

19 Claims. (Cl. 260—86)

The present invention relates to highly viscous polymerization products and to a process of preparing them.

This application is a continuation-in-part of application Serial No. 32,467, filed July 20, 1935.

It is known that by changing the conditions under which polymerization occurs the course of the polymerization may be influenced and the degree of polymerization of the final product correspondingly varied. By the degree of polymerization of a body there is meant, according to Staudinger (see Staudinger "Die hochmolekularen organischen Verbindugen", Kautschuk und Cellulose, Julius Sprenger, Berlin 1932), the molecular size which is expressed by the degree of viscosity of a solution of the body. No industrial process has, however, hitherto been known for the preparation of polymerization products having a particularly high degree of polymerization. In the pertinent literature there is only the general statement that the degree of polymerization is the higher the more slowly the polymerization occurs and the lower the polymerization temperatures (Staudinger). It follows that the opinion exists that by using substances accelerating the polymerization, particularly peroxides, there are obtained final products of low molecular weight.

Now we have found that the contrary is the case when certain peroxides are used and that in such case polymerization products of vinyl esters of organic acids are obtained which have a high degree of polymerization such as has not yet been known. The peroxides of fatty acids containing at least 16 carbon atoms are used and so far as has at present been ascertained the degree of polymerization seems to be the higher, the longer is the carbon chain of the fatty acid peroxide.

It has already been observed that aliphatic peroxides possess a special power of polymerizing to produce bodies of high molecular weight. Whereas, the most known and used peroxide for polymerization purposes, that is the peroxide of benzoic acid, produces relatively low polymerization products, the acetyl peroxide yields already higher polymeric bodies. These latter have, however, an inferior solubility (formation of so-called swollen particles). If, according to the present invention, the length of the carbon chain in the acid of the peroxide is increased, the solubility of the polymerization products obtained is improved and their viscosity also increases. The peroxides of higher fatty acids, therefore, yield two surprising effects: (1) polymerization products of a surprisingly high degree of polymerization and yielding solutions of a high viscosity and (2) polymerization products of a very good solubility in the same solvents in which also the lower polymeric homologues are soluble. For instance when vinylacetate is polymerized with the aid of a peroxide of a fatty acid containing at least 16 carbon atoms it is possible to obtain polymerization products showing a molecular weight of at least about 50,000 according to Staudinger. Polymerization products of vinylesters of such a high molecular weight have hitherto not been known.

As vinyl esters of organic acids suitable for the present invention there may for instance be used vinyl-esters of organic monocarboxylic acids, as vinyl-formate, vinyl-acetate, vinyl-propionate, vinyl-butyrate, vinyl-stearate and vinyl-benzoate. The esters may also be polymerized in admixture with each other or with other unsaturated organic substances yielding mixed polymerization products with vinyl esters, for insance vinyl-methyl ketone, vinylethers, acrylic acid methyl ester and acrylic acid ethyl ester, methacrylic acid methyl ester and methacrylic acid ethyl ester, maleic acid methyl ester and maleic acid ethyl ester or maleic anhydride.

Acids with at least 16 carbon atoms yielding suitable peroxides for the present invention are, for instance, palmitic acid and stearic acid. Dipalmityl peroxide as well as distearyl peroxide show the property that during the polymerization of the above-named unsaturated compounds they yield polymerization products of a much higher molecular weight than the same quantities of dibenzoyl peroxide, diacetyl peroxide or dibutyryl peroxide.

We have examined numerous peroxides in order to ascertain whether they are qualified for the polymerization of vinyl esters of organic acids and we have found that the peroxides of the fatty acids containing at least 16 carbon atoms always yield polymerization products of a higher molecular weight than the same quantities of all the other peroxides. The following results were obtained for instance with dibutyryl-peroxide in comparison with distearyl-peroxide or dipalmityl-peroxide.

On using 4 per cent. of the peroxide, calculated on the monomeric product to be polymerized, for instance vinylacetate, dibutyryl-peroxide yields a polymerization product of a molecular weight of about 18,000 to 20,000; distearyl-peroxide, however yields a polymerization product of a molecular weight of about 33,000 if, in each case, 3 per cent. of the catalyst are applied, the molecular weights are about 20,000 to 25,000 and about 38,000 respectively, and if in each case 2 per cent. of the catalyst are applied, the molecular weights are about 30,000 and about 45,000 respectively. On using still smaller quantities of the catalyst there are obtained polymerization products of molecular weights of far more than 50,000. If di-acetyl-peroxide or dibenzoyl-peroxide is used instead of dibutyryl-peroxide, polymerization products of still lower molecular weights than those above referred to are obtained.

During our investigations we have furthermore found that there exists a principal difference between the action of the high molecular fatty acid peroxides during the polymerization of vinyl chloride on the one hand and of vinyl esters of organic acids on the other hand. During the polymerization of vinyl esters of organic acids the peroxides of fatty acids containing at least 16 carbon atoms yield polymerization products which are of a higher molecular weight than the polymerization products obtained with the aid of other peroxides; now the peroxides of the said high molecular fatty acids have no action of this kind in the polymerization of the vinyl chloride. During our investigations vinyl chloride as well as vinyl acetate have been polymerized with equal proportions of dibenzoyl peroxide on the one hand and dipalmityl peroxide on the other hand and the viscosities of solutions of the same concentration of the polymerization products have been examined. We have found that the solutions of the polymerization products of vinyl acetate obtained with the aid of dipalmityl peroxide have a viscosity which is three to five times as high as that of solutions of vinyl acetate polymerized with dibenzoyl peroxide. In the case of vinyl chloride, however, the viscosities of the polymerization products obtained with dibenzoyl peroxide are substantially identical with the viscosities of the products prepared with dipalmityl peroxide.

Mixed peroxides of organic carboxylic acids with fatty acids containing at least 16 carbon atoms are likewise useful, for instance the mixed peroxide stearic acid and succinic acid.

The peroxides most suitable for the present invention are the peroxides of unsaturated fatty acids with 18 carbon atoms. These peroxides, particularly the dioleyl peroxide, yield polymerization products of an especially high molecular weight and at the same time of particularly favorable properties. The hitherto known polymerization products of vinyl esters of organic carboxylic acids, especially of vinyl acetate, had at most a molecular weight of about 40,000 to 45,000. If there is tried to prepare polymerization products of particularly high molecular weight, by using especially small quantities of the peroxides used as a catalyst, it has been found that in the case of a molecular weight of more than about 50,000 the polymerization products are no longer soluble in the usual solvents to a homogeneous solution. As the usual solvents there may be used aromatic hydrocarbons, such as benzene, toluene, xylene; esters, such as ethyl acetate; aliphatic and aromatic chlorinated hydrocarbons, such as methylene chloride, chloroform, trichloroethylene, chlorobenzene, chlorotoluene; alcohols, such as methyl-alcohol, ethyl-alcohol, propyl-alcohol, butyl-alcohol; ketones such as acetone or methyl-ethylketone.

If there is tried to dissolve the above named polymerization products with a molecular weight of more than about 50,000 in one of the said solvents, so-called swollen particles are formed; the solutions are, therefore, not homogeneous. In the case of still higher molecular weights the polymerization products may even be entirely insoluble. Such products may be worked up so as to obtain other valuable polymerization products, for instance particularly highly viscous, water-soluble polyvinyl alcohol, but they cannot be used for the preparation of lacquers or the like.

If polymerization products of the vinyl esters of organic acids are prepared in the presence of the above-named peroxides of unsaturated fatty acids containing 18 carbon atoms, particularly of dioleyl peroxide, there are obtained polymerization products which are still soluble in the usual solvents, for instance those named above, to form even a clear and homogeneous solution, though they have molecular weights of more than about 50,000. As far as we could ascertain these polymerization products remain soluble to a homogeneous solution even if their molecular weight is considerably increased. We have prepared polymerization products of vinyl acetate for instance in the presence of dioleyl peroxide which have molecular weights of about 75,000 to about 100,000 and, nevertheless, are soluble to a clear and homogeneous solution.

As further peroxides of unsaturated fatty acids with 18 carbon atoms there may be named: the peroxides of acids having several unsaturated bonds and obtainable from linseed oil, such as linoleic acid, linolenic acid; furthermore alpha and beta-alaeo-stearic acid, finally ricinoleic acid. The mixed peroxides of said unsaturated fatty acids with other carboxylic acids are likewise useful, but not quite as good.

If in the afore-said paragraphs the molecular weights of the polymerization products have been named, these statements relate in the first line to the polyvinyl esters of organic carboxylic acids of low molecular weight, particularly to polyvinyl acetate. Polyvinyl esters of carboxylic acids with higher molecular weight have, at the same degree of polymerization, correspondingly higher molecular weights. As vinyl acetate has a molecular weight of 86, a polymerization product of vinyl acetate of a molecular weight of about 50,000 has a polymerization degree of about 600; a polyvinyl acetate of a molecular weight of 86,000 a polymerization degree of 1000, i. e. about 600 or 1000 molecules respectively of the monomeric vinyl acetate form a molecule of the polymeric product.

The polymerization is carried out in known manner. According to the kind of the monomeric starting material and to the conditions obtaining, for instance the presence of a solvent or a diluent, temperature, proportion of the catalyst (for instance about 0.05 to 4 per cent. calculated upon the monomeric compound to be polymerized) and the like, the course of the polymerization and the properties of the final product may be varied. It is advantageous to carry out the polymerization at about the boiling point of the vinyl ester.

The process constitutes a very important industrial progress, because with its aid it is possible to obtain polymeric compounds having a degree of viscosity and other good properties as have hitherto not been known in synthetic compounds. Particularly remarkable is above all the small danger attaching to the higher aliphatic fatty acid peroxides in comparison with benzoyl peroxide.

The following examples serve to illustrate the invention but they are not intended to limit it thereto, the parts being by weight:

(1) A mixture of 500 parts of vinyl acetate and 0.5 part of oleic acid peroxide is introduced into the polymerization vessel and polymerized at 80° C. to 85° C. After the whole has been entered heating is continued for about 20 hours. The solid polymerization product thus produced is clear as glass and dissolves in the solvents usual for polyvinylacetate so as to form an entirely clear solution, i. e. without forming an apparently curdled mass. The viscosity of the polymerization product is 80 to 100 times the viscosity of a polymerization product prepared with the same quantity of the hitherto usual benzoylperoxide and also a multiple of a polymerization product prepared with the same quantity of acetyl peroxide.

(2) 400 parts of vinyl butyrate and 1 part of benzoylstearyl peroxide are polymerized at 80° C. to 85° C. as described in Example 1; heating is continued for 10 hours. The viscosity of the product obtained amounts to ten times the viscosity of a polymerization product obtained with the same quantity of benzoyl peroxide.

(3) 500 parts of vinyl acetate are polymerized at 80° C. to 85° C. with 1 part of stearic acid peroxide and 0.5 part of an aldehyde; heating is continued for several hours. The viscosity of the polymerization product which dissolves to an entirely clear solution is at least twenty times that of a polymerization product prepared according to the hitherto known methods.

(4) A mixture of 600 parts of vinyl acetate and 125 parts of maleic acid dimethyl ester to which 3.5 parts of oleic acid peroxide (about ½ per cent. of the polymerization component) are added is polymerized to form a block by introducing the mixture at 80° C. drop by drop into a vessel. After the product has been dried, a benzene solution of 10 per cent. strength of it shows a viscosity requiring a period of 1990 seconds for the standard flow in contradistinction to 665 seconds if the same quantity of benzoyl peroxide is used.

(5) If in Example 4 only 0.7 part of oleic acid peroxide ($=\frac{1}{10}$ per cent.) is used instead of 3.5 parts there is obtained a polymerization product of the viscosity requiring a period of 3825 seconds for the standard flow. A comparative polymerization with $\frac{1}{10}$ per cent. of benzoyl peroxide yields a product of an essentially lower viscosity.

(6) A solution of 500 parts of vinylformate and 2.5 parts of oleic acid peroxide in 200 parts of acetone and 100 parts of methylene chloride is polymerized at 60° C. to 65° C. by introducing it drop by drop into the polymerization vessel. In order to remove traces of monomeric vinylformate the polymerization product is precipitated by pouring the solution into ether; the product is then dried. A polymerization product which is soluble in acetone to a clear solution is obtained. If 2.5 parts of benzoylperoxide are used as a catalyst instead of oleic acid peroxide, a product is obtained which does not dissolve in the solvent to a clear solution but to a solution which still contains some swelled particles. Moreover the viscosity in the former case is more constant than in the latter case.

We claim:

1. The process which comprises polymerizing vinyl esters of organic acids in the presence of peroxides of fatty acids containing at least 16 carbon atoms.

2. The process which comprises polymerizing vinyl esters of organic monocarboxylic acids in the presence of peroxides of fatty acids containing at least 16 carbon atoms.

3. The process which comprises polymerizing vinyl esters of organic monocarboxylic acids together with organic unsaturated compounds known to yield interpolymerization products with said vinyl esters and effecting the polymerization in the presence of peroxides of fatty acids containing at least 16 carbon atoms.

4. The process which comprises polymerizing vinyl esters of organic acids in the presence of mixed peroxides of organic carboxylic acids with fatty acids containing at least 16 carbon atoms.

5. The process which comprises polymerizing vinyl esters of organic monocarboxylic acids in the presence of mixed peroxides of organic carboxylic acids with fatty acids containing at least 16 carbon atoms.

6. The process which comprises polymerizing vinyl esters of organic monocarboxylic acids together with organic unsaturated compounds known to yield interpolymerization products with said vinyl esters and effecting the polymerization in the presence of mixed peroxides of organic carboxylic acids with fatty acids containing at least 16 carbon atoms.

7. The process which comprises polymerizing vinyl esters of organic acids in the presence of peroxides of unsaturated fatty acids containing 18 carbon atoms.

8. The process which comprises polymerizing vinyl esters of organic monocarboxylic acids in the presence of peroxides of unsaturated fatty acids containing 18 carbon atoms.

9. The process which comprises polymerizing vinyl esters of organic monocarboxylic acids together with organic unsaturated compounds known to yield inter-polymerization products with said vinyl esters and effecting the polymerization in the presence of peroxides of unsaturated fatty acids containing 18 carbon atoms.

10. The process which comprises polymerizing vinyl esters of organic acids in the presence of mixed peroxides of organic carboxylic acids with unsaturated fatty acids containing 18 carbon atoms.

11. The process which comprises polymerizing vinyl esters of organic monocarboxylic acids in the presence of mixed peroxides of organic carboxylic acids with unsaturated fatty acids containing 18 carbon atoms.

12. The process which comprises polymerizing vinyl esters of organic monocarboxylic acids together with organic unsaturated compounds known to yield inter-polymerization products with said vinyl esters and effecting the polymerization in the presence of mixed peroxides of organic carboxylic acids with unsaturated fatty acids containing 18 carbon atoms.

13. The process which comprises polymerizing vinyl acetate in the presence of oleic acid peroxide at a temperature of about 80° C. to 85° C.

14. The process which comprises polymerizing vinyl acetate in the presence of stearyl peroxide at a temperature of about 80° C. to 85° C.

15. The process which comprises polymerizing a mixture of vinyl acetate with maleic acid dimethylester in the presence of oleic acid peroxide.

16. Polymerization products according to claim 7, said products yielding clear, homogeneous solutions in organic solvents and having a polymerization degree of at least about 600.

17. Polymerization products according to claim 9, said products yielding clear, homogeneous solutions in organic solvents and having a polymerization degree of at least about 600.

18. Polymerization products according to claim 13, said products yielding clear, homogeneous solutions in organic solvents and having a polymerization degree of at least about 600.

19. Polymerization products according to claim 15, said products yielding clear, homogeneous solutions in organic solvents and having a polymerization degree of at least about 600.

ARTHUR VOSS.
JOHANNA AUGUSTE ASTA HEUER,
As *Administratrix of Werner Heuer, deceased.*